Patented Oct. 29, 1929

1,733,498

UNITED STATES PATENT OFFICE

LESTER KIRSCHBRAUN, OF LEONIA, NEW JERSEY

AQUEOUS DISPERSION AND PROCESS OF MAKING SAME

No Drawing.   Application filed January 2, 1928.   Serial No. 244,059.

This invention relates to improvements in aqueous dispersions of solid and semi-solid materials normally immiscible with water, and particularly to those which may be generically designated as bitumen-pitch type bases.

One of the commercially successful methods by which materials of this character have been transformed into dispersions in water, comprises generally speaking, an agitating treatment of the said material in the presence of a mineral powder colloid which functions as a dispersing agent to aid in causing the material to assume a finely divided and dispersed condition in water. A process of this type is set forth more fully in my issued United States Patent No. 1,615,303.

In the production of dispersions in accordance with the disclosure of said patent, a large variety of substances, as therein specified may be employed as the dispersing media, the particular agent selected for this purpose determining to some extent the character of the final product. Thus, with certain types of colloidal clays and under certain conditions of manipulation the dispersion will be characterized by insufficiently fine particle size, so that the particles tend to settle out of suspension. Though this tendency may not be objectionable where the dispersion is to be utilized immediately or soon after its production, it will be appreciated that in many instances in normal procedure, a considerable period of time elapses between the manufacture of the dispersion and its application. The foregoing tendency towards settling, therefore, becomes objectionable in such cases, and in fact may constitute a somewhat serious drawback to the use of such material. The present invention has for one of its objects the provision of methods by which the settling out of the particles is dispersions made with dispersing agents of the type indicated may be counteracted and prevented. The invention in this aspect comprises the incorporation of protective colloids acting positively to maintain the dispersed particles in relatively permanent suspension in the aqueous phase so as to present at all times a product of substantially uniform consistency throughout, and eliminate the necessity for the severe and prolonged agitating treatment usually required to distribute the particles which have settled or packed at the bottom of the barrels or other containing vessels, in order to render the mass uniform and homogeneous.

The protective colloids which may be used for this purpose include such organic substances as gums, starch, dextrine, tapioca flour, tannic acid and the like.

I have found, for example, that starch may be used as a protective colloid for this purpose and the quantity thereof may comprise about 3% to 8%, more or less, by weight of the dispersion. Similarly, about 1% to 3%, more or less, of tapioca flour will suffice to produce a degree of suspendability within the range usually desired.

Another material which has been found to be suitable in this connection, is tannic acid, and where quantities of say, ¼ to 1% by weight of this material are incorporated in a non-suspendible dispersion of relatively fine particle size, smaller quantities of water are generally necessary to give the proper consistency and body in the dispersion and the tendency towards packing of the dispersed particles is largely eliminated.

In the treatment of non-suspendible dispersions with a protective colloid or suspending agent to produce a suspendible product, the particle size of the non-suspendible dispersion is a prime factor in the efficiency of treatment with the protective colloid. Thus, the particle size may be so large that no reasonable treatment can be applied successfully, but as the particle size becomes smaller the treatment becomes less difficult and smaller quantities of protective agent will function to produce the desired result. In other words, the character and amount of the suspending agent used for this purpose must be adjusted in relation to the particle size of the dispersion to be treated.

One of the advantages of employing protective colloids such as those enumerated for the purpose of producing suspendability in the dispersion is that these colloids serve also to protect the dispersion against the action of freezing temperatures. When these dispersions containing protective colloids are subjected to temperatures sufficiently low to cause freezing of the aqueous medium, the protective action of the colloid functions to prevent the agglomeration of the particles so that the dispersion may be completely thawed out without injury.

It will be understood by those skilled in the art to which the present invention relates, that dispersions of the type here referred to are adaptable to a large number of uses wherein the material is applied in the form of a thin film or layer, the aqueous content of which is then removed, permitting at the same time a coalescence of the dispersed particles of the bitumen-pitch base and the formation of a substantially uniform and continuous water-free film composed of the said base and the solid material employed as the dispersing agent in the course of manufacture of the dispersion.

It will be appreciated further, that under such conditions of use, it is highly desirable that the dried water-free film so produced shall be quickly rendered resistant to the action of water and capable of withstanding such action as would tend to cause redispersion of the base present in the film in any given time after drying. In other words, it will be understood that while the untreated product if not containing too much emulsifying agent does become water-resistant after a given period of time by coalescence of the asphalt particles through the interstitial spaces of the enveloping colloid, this action becomes greatly accelerated in point of time by the presence of the substances referred to. When employed as herein described this coalescence and/or wetting of the enveloping colloid is so rapidly accelerated that as compared with the untreated material substantially complete ability to resist water action is obtained in a much shorter period of time after the film is dried.

In treating relatively non-suspendible dispersions in accordance with the procedures hereinbefore described for the purpose of improving the body and suspendability thereof and eliminating the tendency for the dispersed particles to settle and pack, it is found that the aforesaid advantage is, in certain instances, offset by an impairment of the water resistance of the dried dispersion film within a given drying time, through the introduction of the protective colloid into the dispersion. This disadvantage is, in certain instances, due to the nature of the protective colloid itself, while in other instances it is apparently caused by the relatively large quantities of protective colloid added to the dispersion. It is therefore generally desirable to employ the smallest possible amount of protective colloid.

I have found, however, that a dispersion containing a protective colloid may be subjected to treatment with acids whereby the essential water resistant properties of the film when dry and water-free shall be rapidly reached without impairing the suspendability of the dispersion. For this purpose, for example, a dispersion of Mexican asphalt of 100° to 200° F. melting point, made with a New Jersey pottery clay as the dispersing media, and containing about 1% to 3% of tapioca flour, may be treated with 0.05 to 0.1% of hydrochloric acid, the whole being agitated during the addition of the acid, and sufficient water being added to overcome any tendency towards undue thickening which may be caused by the acid. After the desired amount of acid has been introduced, the dispersion may be subjected to continued agitation whereby the viscosity thereof will be reduced, the resultant product being heavily bodied, relatively suspendible and its water-free film being substantially impermeable in a relatively short period of time after drying.

In place of hydrochloric acid there may be substituted phosphoric acid in quantities of about .1% by weight of the dispersion, with substantially similar results. Where starch is used as the suspending agent for a dispersion made with ball clay, and the dispersion contains about 3% of the starch, hydrochloric acid in amounts of about .05% by weight of the dispersion is sufficient to produce a film of the requisite tightness.

Generally, though not in every instance, the amount of acid should be sufficient to bring the pH of the dispersion to a value of about 3.5.

Similarly, a dispersion made with New Jersey pottery clay or with a mixture of about 70% of this clay and 30% of bentonite, and containing from ⅛ to 1% of a protective colloid such as tanic acid, may be treated with mineral acid or with acid salts and acids for the purpose of increasing the water resistance of the dried film of the dispersion, in a given period of time.

Ordinarily the addition of acids or similar electrolytes to dispersions of the type here contemplated in the absence of protective colloids, may produce a certain degree of flocculation, and if this flocculation is not dissipated or relieved in some way as by the addition of water, or by a continued beating action, or better, by further reduction of particle size, the particles may become flocculated to such an extent as to impair the suspendability of what otherwise is a relatively suspendable dispersion. I have found from experiment, that the size of the dispersed particles plays a very important part in producing suspendability, and that if the dispersion can be made with particles of an exceedingly fine order of subdivision, the aforestated difficulties may be eliminated, and the product obtained will be suspendible, very smoothly and heavily bodied and capable of withstanding the addition of the requisite quantity of acid, or the like, without in any wise impairing its suspendability.

I have found in accordance with the present invention, that dispersions in which the particles dispersed are sufficiently fine to produce the aforesaid results, may be obtained by permitting the mass being treated to assume a very thick and heavy consistency in the presence of a protective colloid.

When a thick mass of this character is agitated, the tendency of this action is to cause further subdivision of the dispersed particles, and where no protective agent such as the protective colloids which I may use, is present, the particles may coalesce and form coarse, grainy particles, and if this tendency is allowed to continue it may result in completely breaking down the dispersion. By my invention the thickened mass is agitated in the presence of the protective colloid with the result that the particles become further and further subdivided into an exceedingly fine size while at the same time the protective colloid functions to protect the finely divided particles and prevent coalescence thereof while undergoing further subdivision.

Accordingly, this feature of the invention may be carried out by adding to the dispersion containing a protective colloid, any suitable acid, acid salt or alkaline earth oxide, or similar substance which will thicken the dispersion, and agitating the thickened mass without attempting to thin the same as by the addition of water. By continuing the agitation for a short time, depending upon the type of apparatus employed, the particle size becomes very much finer, the dispersion is highly suspendible, contains a minimum quantity of the aqueous phase, and the incorporation of the above types of insolubilizing substance provides a product which dries to a film which becomes highly water resistant in a relatively short time.

Illustrating more specifically this form of the invention, asphalt or similar base may be initially dispersed with a mineral colloid such as bentonite. Such a dispersion as generally produced, may comprise, say 57% of asphalt, 3% bentonite and 40% water, more or less, and as such, is relatively suspendible and heavily bodied, and the particles are of a relatively fine size, but the dried film of the dispersion for certain purposes does not become sufficiently quickly resistant to water action. When an attempt is made to thus treat a relatively suspendible dispersion such as one produced with bentonite, the addition of the acid so flocculates the dispersed particles that the latter may be no longer suspendible. In accordance herewith, I avoid this difficulty by adding to the dispersion a protective colloid, such as tannic acid, in amounts approximating ¼% to 1% by weight of the dispersion, and then add to the dispersion containing the protective colloid, acid such as hydrochloric, in quantities of say 0.05% to .2 by weight of the dispersion. The quantity of acid required is easily controlled by pH measurement. The addition of the acid is made slowly and no water is added so that the mass will thicken considerably, and by the continued agitation thereof, I am enabled to produce a further and much finer state of subdivision of the dispersed particles, with the result that the product is then suspendible and the acid treatment provides a highly water resistant film within a relatively short period of time after the aqueous vehicle is removed.

Similar results may be attained by treating as above described, a dispersion comprising 50 to 55% of asphalt, 40 to 45% water and 3% to 10% of dispersive media consisting of, say 70% ball clay and 30% bentonite.

In the presence of about ⅛ to 1% of tannic acid, the aforesaid dispersion may be thickened by the addition of, say 0.05% hydrochloric acid or 0.3% phosphoric acid, this amount of acid being generally sufficient to provide a water-resistant dried film in a short time. Agitation of the thick mass for a short period of time produces a final dispersion of much finer particle size, characterized by its ability to remain in suspension and to dry to a film which rapidly reaches its maximum impermeability.

A dispersion made as above described and containing tannic acid in substantially the quantities indicated, may also be treated with alkaline earth oxides such as magnesium oxide or calcium oxide or substances containing these agents in active form in order to accelerate the time of coalescence of the dried film without in any way affecting the suspendability of the product in its dispersed state.

Substantially similar results may be attained by using any of the other protective colloids herein named or by substituting quebracho for the tannic acid. This material is an extract of the bark of the quebracho tree and contains compounds of tannin in amounts equivalent to about 35% of its weight of tannic acid. Hence, where this material is available it may be used as the protective colloid in substantially the manner herein described, and in quantities such that the tannin content thereof approximates the quantities of tannic acid given in the above illustrations. The product made with this material is substantially similar to the dispersion made as above described with tannic acid as the protective colloid.

I have also found as a further feature of the present invention, that dispersions of exceedingly fine particle size may, in certain instances, be produced by combining the protective colloid with the particular dispersive media employed and then carrying on the dispersion with the combined mixture of dispersing agent and protective colloid, the batch being dispersed may be maintained very thick and viscous. The continued agitation of the mass causes extremely fine division of the particles which are thereupon retained in such finely divided state and prevented by the protective colloid from coalescing with neighboring particles while being under the mechanical influence of the dispersive action.

Specifically, the foregoing procedure may be carried into effect by combining with a mineral powder dispersing agent such as bentonite, about 4% to 10% of tannic acid. This mixture when employed as above set forth, produces an initial dispersion of a base, such as asphalt, in particles of extremely fine size, in which dispersion the solid constituents may comprise 70% to 75%, of which 90% to 97% constitutes the dispersed base. The remaining 25% to 30% of the dispersion is, of course, the aqueous phase. The initial dispersion thus produced may then be treated with acid as above described, when it will be found that substantially no flocculation takes place and the long heavy body and permanent suspendability of the product are not perceptibly affected.

This beneficial result may be attributed to the extremely small size of the particles and the presence of the protective colloid as hereinbefore pointed out.

In other illustrations of this form of the invention, ball clay, fine slate dust, powdered pigments, or carbon flour may be combined with small quantities of tannic acid and made into a paste of suitable consistency for use as the dispersive media. Specifically illustrating this form of the invention, about nine parts of ball clay and one part of tannic acid, or its equivalent in tannic extract, may be made into an aqueous paste whereupon this paste may be utilized as herein described for dispersing bitumens; the dispersed product in such case being highly suspendible, possessed of a much finer particle size than can be obtained with the clay alone, and comprises, say 60 parts of the bitumen, 5 parts of the combined dispersing media, and 35 parts of water, more or less. This product has a somewhat gelatinous body. I have further found that when alkali, such as sodium or ammonium hydroxide is added to a product as thus produced, the body thereof is transformed gradually from a more or less gelatinous body to a long body so that it pours somewhat like heavy tar or heavy molasses. The degree to which this transformation of the body may be effected may be regulated, depending upon the tannin content of the dispersion, by regulating the amount of alkali added to the dispersion, in relation to the tannic acid remaining unneutralized with the alkali.

I claim as my invention:

1. The process of producing aqueous bitumen-pitch-type dispersions which comprises the steps of dispersing bitumen in an aqueous vehicle with an emulsifying agent in sufficient quantities to effect emulsification, in thereafter adding to the thus formed emulsion a protective colloid adapted to counteract the settling of the dispersed particles and in subsequently adding an agent to the dispersion whereby to accelerate the coalescence of the bitumen particles in the dried film.

2. The process which comprises making a bituminous pitch-type emulsion by dispersing bitumen in a fluid vehicle with an emulsifying agent, in thereafter adding a protective colloid thereto, causing a thickening of the dispersion and in thereafter subjecting the thus thickened mass to sufficient agitation whereby to effect further sub-division of the dispersed particles.

3. In a process of incorporating into an aqueous dispersion of a bitumen-pitch-type base electrolytes of such character and in same amount as would normally produce flocculation, the improvement which comprises subjecting the treated dispersion to sufficient beating action in the presence of a protective colloid to substantially dissipate thickening caused by flocculation and render the dispersion suspendible.

4. In a process of incorporating into an aqueous dispersion of a bitumen-pitch-type base relatively small quantities of acidic material of such character and in such amount as would normally produce flocculation, the improvement which comprises subjecting the treated dispersion to sufficient beating action in the presence of a protective colloid to substantially dissipate thickening caused by flocculation and render the dispersion suspendible.

5. In a process of incorporating into an aqueous dispersion of a bitumen-pitch-type base alkaline earth oxide in such amount as would normally produce flocculation, the improvement which comprises subjecting the treated dispersion to sufficient beating action in the presence of a protective colloid to substantially dissipate thickening caused by flocculation and render the dispersion suspendible.

6. In a process of incorporating into an aqueous dispersion of a bitumen-pitch-type base containing a clay-like dispersing agent, electrolytes of such character and in such amount as would normally produce flocculation, the improvement which comprises subjecting the treated dispersion to sufficient beating action in the presence of a protective colloid to substantially dissipate thickening caused by flocculation and render the dispersion suspendible.

7. In a process of incorporating into an aqueous dispersion of a bitumen-pitch-type base containing bentonite as the dispersing agent electrolytes of such character and in such amount as would normally produce flocculation, the improvement which comprises subjecting the treated dispersion to sufficient beating action in the presence of a protective colloid of the tannic acid type to substantially dissipate thickening caused by flocculation and render the dispersion suspendible.

8. The process which comprises treating an aqueous bitumen-pitch-type dispersion with an electrolyte of such a character and in quantity sufficient to produce thickening, and subjecting the thickened dispersion to sufficient agitation in the presence of a protective colloid to effect further subdivision of the dispersed particles.

9. The process which comprises treating an aqueous bitumen-pitch-type dispersion with relatively small quantities of acidic material of such a character and in an amount sufficient to produce thickening, and subjecting the thickened dispersion to sufficient agitation in the presence of a protective colloid to effect further subdivision of the dispersed particles.

10. The process of treating bituminous water external phase dispersions having an emulsifying agent and a protective colloid contained therein, the improvement which comprises adding to the dispersion an agent to accelerate coalescence of the water free film, the accelerating agent being of such character and present in such proportions relative to the protective colloid as to secure the desired acceleration while maintaining the dispersion in a suspendible condition.

11. A process of treating a bitumen-pitch-type dispersion having water in the external phase for the purpose of accelerating the coalescence of the bitumen in the dried film which comprises incorporating into the dispersion a protective colloid and an accelerating agent, and regulating the proportion of one relative to the other to accelerate the coalescence of the water free film while maintaining the dispersion in suspendible condition.

12. The process of treating bituminous water external phase dispersions having an emulsifying agent and a protective colloid contained therein, the improvement which comprises adding to the dispersion a flocculating agent to accelerate coalescence of the water free film, the accelerating agent being of such character and present in such proportions relative to the protective colloid as to secure the desired acceleration while maintaining the dispersion in suspendible condition.

13. A bitumen-pitch-type dispersion containing water as the external phase, comprising a dispersing agent, a protective colloid and substantial quantities of an agent adapted to accelerate coalescence of the water free film, the proportion of protective colloid to the accelerating agent being such that the dispersion is capable of remaining in suspension.

14. A bitumen-pitch-type dispersion containing water as the external phase comprising a dispersing agent, a protective colloid and substantial quantities of an electrolyte adapted to accelerate coalescence of the water free film, the proportion of protective colloid to electrolyte being such that the dispersion is capable of remaining in suspension.

15. A dispersion resistant to inversion by electrolytes comprising bitumen-pitch-type base dispersed in an aqueous vehicle containing a dispersing agent of the mineral powder type, a protective colloid and an accelerating agent, the proportion of protective colloid to accelerating agent being such that the dispersion is capable of remaining in suspension and further is capable of accelerating coalescence of the bitumen in the dried film.

16. A bitumen-pitch-type dispersion containing water as the external phase and comprising bentonite-like material as the dispersing agent, a protective colloid comprising tannic acid and substantial quantities of an electrolyte adapted to accelerate coalescence of the water-free film, the proportion of tannic acid to electrolyte being such that the dispersion is capable of remaining in suspension.

In testimony whereof I affix my signature.

LESTER KIRSCHBRAUN.